(12) United States Patent
Dorschner et al.

(10) Patent No.: US 11,255,365 B2
(45) Date of Patent: Feb. 22, 2022

(54) FASTENER ASSEMBLY

(71) Applicant: ILLINOIS TOOL WORKS INC., Glenview, IL (US)

(72) Inventors: Stephane Dorschner, Weiterswiller (FR); Laurent Vogler, Brumath (FR); Michel Kuhm, Ingwiller (FR)

(73) Assignee: Illinois Tool Works Inc., Glenview, IL (US)

( * ) Notice: Subject to any disclaimer, the term of this patent is extended or adjusted under 35 U.S.C. 154(b) by 374 days.

(21) Appl. No.: 16/466,481

(22) PCT Filed: Nov. 27, 2017

(86) PCT No.: PCT/US2017/063270
§ 371 (c)(1),
(2) Date: Jun. 4, 2019

(87) PCT Pub. No.: WO2018/111524
PCT Pub. Date: Jun. 21, 2018

(65) Prior Publication Data
US 2020/0063778 A1    Feb. 27, 2020

Related U.S. Application Data

(60) Provisional application No. 62/433,462, filed on Dec. 13, 2016.

(51) Int. Cl.
*F16B 21/08* (2006.01)
(52) U.S. Cl.
CPC ............ *F16B 21/086* (2013.01); *F16B 21/08* (2013.01)
(58) Field of Classification Search
CPC ...... F16B 5/065; F16B 21/084; F16B 21/086; F16B 21/08; Y10S 411/913; Y10T 24/309; Y10T 24/42
(Continued)

(56) References Cited

U.S. PATENT DOCUMENTS 3,678,797 A * 7/1972 Seckerson ............. F16B 21/086
411/509
4,981,405 A * 1/1991 Kato ...................... F16B 21/02
24/297
(Continued)

FOREIGN PATENT DOCUMENTS

CN    101356379 A    1/2009
CN    101438065 A    5/2009
(Continued)

OTHER PUBLICATIONS

International Search Report for PCT/US2017/063270, dated Feb. 15, 2018, 2 pages.
(Continued)

*Primary Examiner* — Roberta S Delisle
(74) *Attorney, Agent, or Firm* — Quarles & Brady LLP

(57) ABSTRACT

A fastener assembly (100) includes a securing panel (102) and a fixation member (104) that projects away from the securing panel along a center axis (101). The fixation member includes opposing arms (106, 108) that are angled toward the center axis and opposite ribs (118, 120) disposed between the arms and angled toward the center axis. The fixation member is inserted through openings in first and second components. The arms engage the first component and the securing panel engages the second while the fastener assembly is in a locked state to secure the first and second components together. The fixation member is partially rotated around the center axis to transition the fixation member to an unlocked state. The ribs are brought into contact with an edge of the first component and the arms are moved out of contact with the first component while the fastener assembly is in the unlocked state to decouple the components from each other.

20 Claims, 7 Drawing Sheets

(58) Field of Classification Search
USPC .......................................... 411/24, 508–510
See application file for complete search history.

(56) References Cited

U.S. PATENT DOCUMENTS

| | | | | |
|---|---|---|---|---|
| 5,046,223 | A * | 9/1991 | Kraus | F16B 21/086 24/453 |
| 5,173,026 | A * | 12/1992 | Cordola | F16B 5/065 24/297 |
| 5,368,261 | A * | 11/1994 | Caveney | F16L 3/233 248/73 |
| 6,612,795 | B2 * | 9/2003 | Kirchen | F16B 21/02 24/297 |
| 7,152,281 | B2 * | 12/2006 | Scroggie | B60R 13/0206 24/297 |
| 7,549,830 | B2 * | 6/2009 | Cooley | F16B 21/086 24/297 |
| 2006/0099051 | A1 * | 5/2006 | Moerke | F16B 19/008 411/508 |
| 2009/0022567 | A1 | 1/2009 | Huet | |
| 2012/0073089 | A1 | 3/2012 | Buillas | |
| 2013/0199004 | A1 * | 8/2013 | Kirchen | F16B 13/02 24/595.1 |
| 2014/0196259 | A1 | 7/2014 | Kuhm et al. | |
| 2015/0089778 | A1 | 4/2015 | Tisol, Jr. | |
| 2015/0322985 | A1 * | 11/2015 | Scroggie | F16B 5/0084 29/428 |

FOREIGN PATENT DOCUMENTS

| | | |
|---|---|---|
| JP | 200055021 A | 5/2000 |
| JP | 2014137111 A | 7/2014 |
| JP | 2016169842 A | 9/2016 |
| WO | 2013165948 A1 | 11/2013 |
| WO | 2014043145 A1 | 3/2014 |

OTHER PUBLICATIONS

Notification of Result of Substantive Examination Report from corresponding Indonesian Patent Application No. P00201904850 dated Jun. 17, 2021 (8 pages) (English translation included).
First Office Action from corresponding Chinese Patent Application No. 201780076685.X, dated Sep. 15, 2020 (16 pages).
Search Report, from related CN Application No. 201780076685.X, dated Sep. 7, 2020 (2 pages).

* cited by examiner

FASTENER ASSEMBLY

RELATED APPLICATIONS

This application represents the United States National Stage of International Application No. PCT/US2017/063270, filed Nov. 27, 2017, which claims priority to U.S. Provisional Patent Application No. 62/433,462, entitled "Fastener Assembly," filed Dec. 13, 2016, both of which are hereby incorporated by reference in their entirety.

FIELD OF EMBODIMENTS OF THE DISCLOSURE

Embodiments of the present disclosure generally relate to a fastener assembly, such as may be used to securely fix an underbody trim to a frame of a vehicle.

BACKGROUND

Various vehicles include an underbody trim that covers and protects components and structures. The underbody trim is secured to a frame of the vehicle. Typically, fasteners are used to secure the underbody trim to the frame. For example, bolts and nuts may be used to secure the trim to the frame. The bolt is inserted from one side of the trim, while the nut is on the opposite side of the trim. As can be appreciated, the process of positioning and aligning bolts and nuts with respect to an underbody trim and frame of a vehicle is time and labor intensive.

SUMMARY OF EMBODIMENTS OF THE DISCLOSURE

In one embodiment, a fastener assembly includes a securing panel that is elongated along two or more directions and a fixation member coupled with the securing panel and projecting away from the securing panel along a center axis. The fixation member includes opposing arms that are angled toward the center axis. The fixation member also includes opposite ribs disposed between the arms and angled toward the center axis, the fixation member configured to be inserted through openings in first and second components. The arms of the fixation member are positioned to engage the first component and the securing panel engages the second while the fastener assembly is in a locked state to secure the first and second components together. The fixation member is configured to be partially rotated around the center axis to transition the fixation member to an unlocked state. The ribs are brought into contact with an edge of the first component and the arms are moved out of contact with the first component while the fastener assembly is in the unlocked state to decouple the first and second components from each other.

In one embodiment, a fastener assembly includes an elongated securing panel and a fixation member that is coupled with the securing panel and that is elongated along a center axis that is orthogonal to directions in which the securing panel is elongated. The fixation member includes cantilevered arms that are angled toward the center axis. The fixation member is configured to be inserted through openings in first and second components. The arms of the fixation member engage the first component and the securing panel engages the second while the fastener assembly is in a locked state to secure the first and second components together. The fixation member is configured to be partially rotated around the center axis to transition the fixation member to an unlocked state to release the first component from the second component.

In one embodiment, a fastener assembly includes a securing panel that is elongated along two or more directions and a fixation member coupled with the securing panel and projecting away from the securing panel along a center axis. The fixation member includes cantilevered arms having free ends that are angled away from the center axis. The fixation member also includes opposite ribs disposed between the arms and angled toward the center axis. The fixation member is configured to be inserted through openings in first and second components. The free ends of the arms of the fixation member engage the first component and the securing panel engages the second while the fastener assembly is in a locked state to secure the first and second components together. The fixation member is configured to be partially rotated around the center axis to transition the fixation member to an unlocked state. The ribs are brought into contact with an edge of the first component and the arms are moved out of contact with the first component while the fastener assembly is in the unlocked state to decouple the first and second components from each other.

DETAILED DESCRIPTION

The present disclosure provides a fastening assembly including a fixation member (such as the arrowhead) that is inserted into a hole of a component, and which locks onto a surface of the component, thereby providing a high retention force. Further, the fastener assembly may be quickly and easily removed from the component through a rotation that causes two opposed ribs to bend as they abut into edge portions of the component that define an oblong hole, and unlock securing hooks of the fixation member form the component. During this motion, pressure exerted by compensation wings of the securing panel pushes the fastener assembly out of the hole. The removed part is undamaged and may be reused.

The ribs also ensure proper position of the fastener assembly within a hole of a component. When properly positioned, the ribs are planar and/or aligned with one another. When improperly positioned, the ribs abut into an edge of a component defining the rib, thereby causing the ribs to bend.

The fastener assembly can be used to secure an underbody trim to a frame of a vehicle. The fastener assembly may be used in conjunction with a tool to automatically fix the underbody trim to the frame. Separate and distinct nuts and bolts are not positioned and aligned with respect to components to be secured together. Further, the fastener assembly is configured to be quickly and easily removed from the trim and frame, so that the underbody trim may be removed if portions of the vehicle need to be serviced, for example. The fastener assembly provides a high retention force and sealingly engages components.

In at least one embodiment, a fixation member, such as an arrowhead fixing structure, is used to guide the fastener assembly into a hole of a first component, such as a frame. The fixation member is configured to secure the fastener assembly to one or more components without rotation, thereby allowing for efficient installation. A sealing member (such as a sealing lip) of the fastener assembly sealingly engages the frame around the hole. Ribs of the fastening assembly are used to confirm proper positioning of the fastener assembly in relation to one or more components (such as a frame and underbody trim). In at least one embodiment, a clearance gap (for example, a groove) ensures that the fastener assembly does not slip relative to the frame.

The fastener assembly may be removed from the component, such as through a sixty degree rotation via a tool. During such motion, the ribs bend as they abut into edges of a component defining a hole, and the lead-in member disconnects from the frame. The fastener assembly may be quickly and easily removed from the frame without being damaged, thereby allowing the fastener assembly to be reused.

Figure 1:
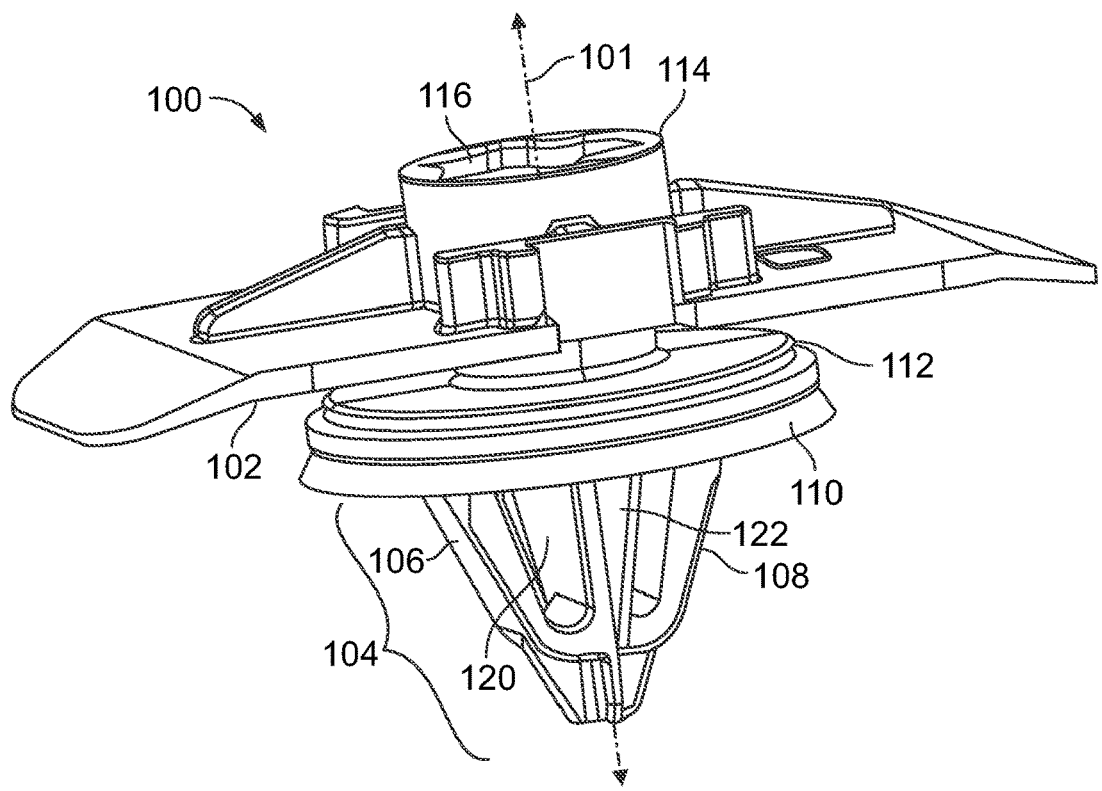
FIG. 1 illustrates a fastener assembly according to an embodiment of the present disclosure.
Figure 2:
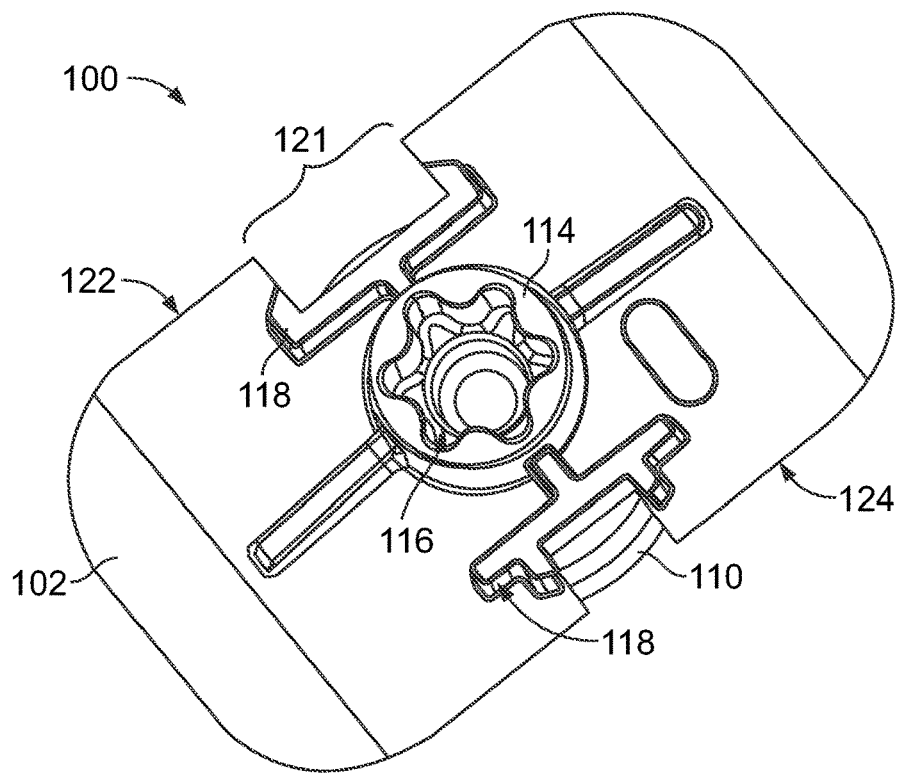
FIG. 2 also illustrates the fastener assembly shown in FIG. 1 according to an embodiment of the present disclosure.

Unlike prior fasteners, the fastener assembly provides a single part that is used to securely fix an underbody trim to a frame of a vehicle. The fastener assembly is secured to the components through a linear motion, instead of a rotary motion. The fastener assembly may be manually or automatically secured to the components by being pushed into a hole of the component(s). Further, the fixation member (such as the arrowhead) provides a high retention force. The fastener assembly allows for a quicker and less costly assembly process FIGS. 1 and 2 illustrate a fastener assembly 100, according to an embodiment of the present disclosure. The fastener assembly 100 includes a securing panel 102 and a fixation member 104 that is configured to be linearly inserted into a hole of a component. The fastener assembly 100 is shaped to be rotated about a center axis or axis of rotation 101. As described herein, the fastener assembly 100 can be inserted into an opening or hole of one or more components to couple the components with each other. The fastener assembly 100 can be partially rotated around the center axis 101 to cause twisting in one or more parts of the fastener assembly 100. This twisting changes a shape of the fastener assembly 100 on one side of the component or components to which the fastener assembly 100 is coupled. The fastener assembly 100 can be removed from the holes or openings in the components while twisted to release the components from each other and to remove the fastener assembly 100 from the holes or openings. The fastener assembly 100 can return to a shape prior to the rotating or twisting so that the fastener assembly 100 can be reused to couple the same or other components.

The fixation member 104 has an arrowhead shape along one end in one embodiment. For example, the fixation member 104 protrudes away from the securing panel 102 along the center axis 101 in one direction. The fixation member includes angled sides or arms 106, 108 that are angled toward each other along the center axis 101 and are angled toward a common point located on the center axis 101. The fixation member 104 also includes ribs 118, 120 located on opposite sides of the fixation member 104 from each other and on opposite sides of the center axis 101.

These ribs 118, 120 are located between the angled arms 106, 108 of the fixation member 104 such that each rib 118 or 120 is between any two of the angled arms 106, 108 in a direction extending around the center axis 101. For example, each of the ribs 118, 120 may be separated from each of the angled arms 106, 108 by ninety degrees in a circular direction around the center axis 101 and each of the angled arms 106, 108 may be separated from each of the ribs 118, 120 by ninety degrees in the circular direction around the center axis 101. The ribs 118, 120 can be separated from each other by one hundred eighty degrees and the angled arms 106, 108 can be separated from each other by one hundred eighty degrees in the circular direction around the center axis 101. A sealing member 110 is configured to sealingly engage portions of the component defining the hole through which the fixation member 104 is inserted. The sealing member 110 can be an annular flexible sealing lip that encircles the center axis 101 and a collar 112 of the fastener assembly 100. The sealing member 110 is large enough to fit around the ribs 118, 120 and angled arms 106, 108 of the fixation member 104. For example, the sealing member 110 can circumferentially encircle the portions of the ribs 118, 120 and the angled arms 106, 108 that are closest to the securing panel 102 in one embodiment.

A tool-receiving head 114 extends from the securing panel 102 along the center axis 101. The tool-receiving head 114 protrudes from the securing panel 102 in a direction that is opposite in which the fixation member 104 protrudes from the securing panel 102. The head 114 can be used to receive a tool to insert the fastener assembly 100 into holes or openings of components, and/or to use the tool to twist and remove the fastener assembly 100 from the holes or openings in the components. For example, the head 114 includes an indentation 116 that is shaped to receive a tool head or other part of a tool to allow the tool to be used to force the fastener assembly 100 along the center axis 101 and/or twist the fastener assembly 100 (e.g., around the center axis 101) relative to the component into which the fixation member 104 is inserted.

As shown in FIGS. 1 and 2, the securing panel 102 laterally protrudes or extends away from the head 114 in opposite directions from the center axis 101. The securing panel 102 is elongated along these directions such that the securing panel 102 forms shoulders that engage the component into which the assembly 100 is inserted.

The side of the securing panel 102 shown in FIG. 2 includes protruding ribs 118 along opposite edges 122, 124 of the panel 102. These ribs 118 extend along or at least partially frame cut-in slots 121 that extend inward into the securing panel 102 from the opposite edges 122, 124 of the panel 102. The slots 121 and ribs 118 engage or are engaged by a tool for automatic insertion or removal of the fastener assembly 100 from a component, as described herein. Part of the sealing member 110 is visible through one of these slots 121 in FIG. 2. Alternatively, the fastener assembly 100 may not include the ribs 118 and/or slots 121 in another embodiment.

Figure 3:
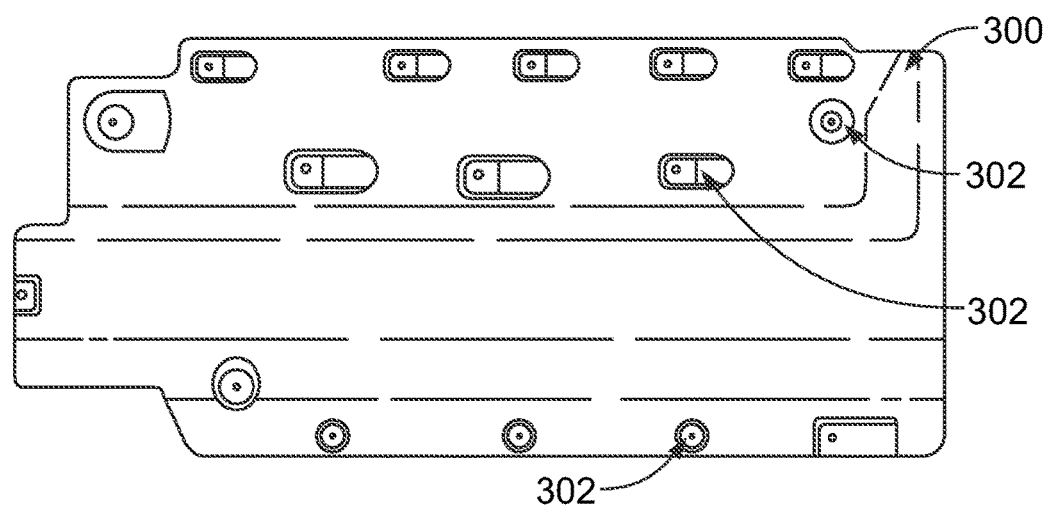
FIG. 3 illustrates a component into which the fastener assembly shown in FIGS. 1 and 2 can be inserted to secure the component to another body, according to an embodiment of the present disclosure.

FIG. 3 illustrates a component 300 into which the assembly 100 shown in FIGS. 1 and 2 can be inserted to secure the component 300 to another body, according to an embodiment of the present disclosure. The component 300 may be an underbody trim of a vehicle, such as an automobile. Alternatively, the component 300 can be another body. One or more fastener assemblies 100 are used to secure the component 300 (e.g., the underbody trim) to another component, such as a frame of a vehicle. The component 300 includes openings or holes 302 into which the fixation member 104 of the assembly 100 is inserted to secure the component 300 to another component or body.

Figure 4:
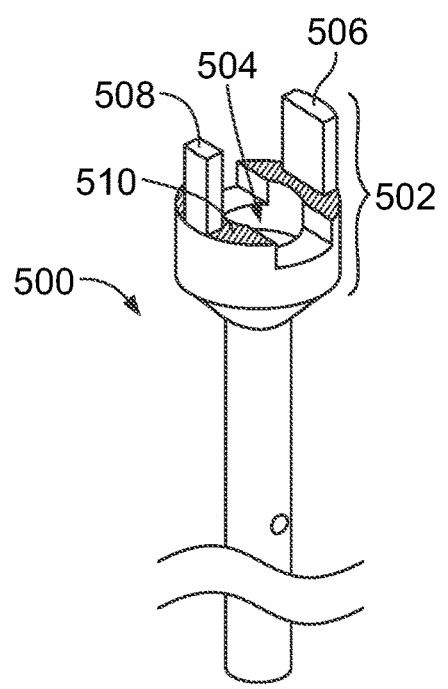
FIG. 4 illustrates a tool for engaging the fastener assembly shown in FIGS. 1 and 2, according to an embodiment of the present disclosure.
Figure 5:
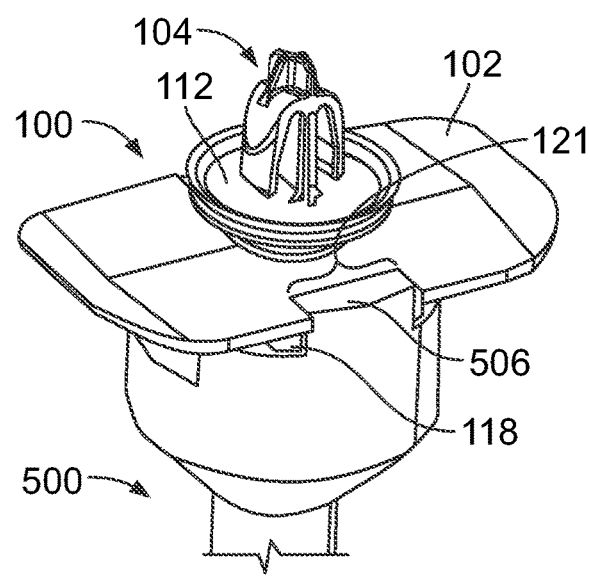
FIG. 5 illustrates the tool shown in FIG. 4 engaged with the fastener assembly shown in FIGS. 1 and 2 according to one embodiment.

FIG. 4 illustrates a tool 500 engaging a fastener assembly 100, according to an embodiment of the present disclosure. FIG. 5 illustrates the tool 500 engaged with the fastener assembly 100 according to one embodiment. The tool 500 may be used to automatically fix the fastener assembly 100 to one or more components. The tool 500 includes a holding head 502 having a recess 504 and opposing protruding arms 506, 508 that hold the fastener assembly 100. The recess 504 receives the head 114 of the fastener assembly 100.

Figure 6:
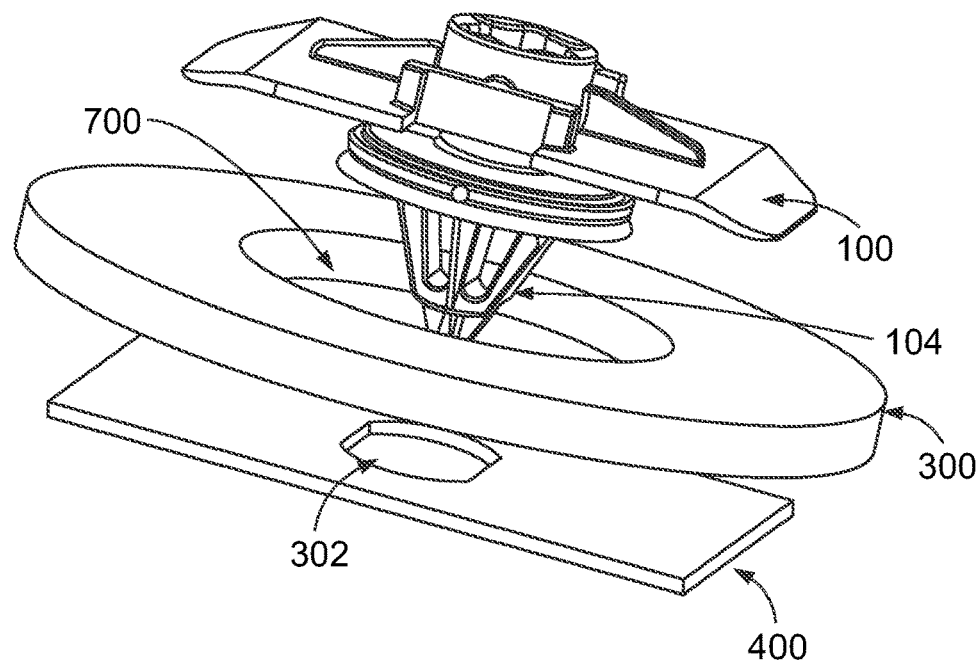
FIG. 6 illustrates an exploded view of the fastener assembly shown in FIGS. 1 and 2 and the components coupled by the fastener assembly according to one embodiment.

The arms 506, 508 of the tool 500 protrude in directions that are along or parallel to a direction in which the tool 500 is elongated. The arms 506, 508 are received into the slots 121 in the securing panel 102 of the fastener assembly 100, as shown in FIG. 6. The ribs 118 protruding from the securing panel 102 on the fastener assembly 100 can lift the fastener assembly 100 upward from a lower surface portion 510 of the tool head 502 shown in FIG. 5 so that the surface of the securing panel 102 that is visible in FIG. 5 is flush (e.g., coplanar) with the upper ends of the arms 506, 508. This can ensure that the securing panel 102 engages an outer surface of a component without the arms 506, 508 damaging the surface or the component.

The receipt of the arms 506, 508 into the slots 121 in the fastener assembly 100 permit rotation of the tool 500 to cause rotation of the fastener assembly 100. As described herein, the fastener assembly 100 can be partially rotated to twist the fixation member 104 relative to the components coupled by the fastener assembly 100. This twisting action can be created by engaging the head 114 of the fastener assembly 100 with the tool 500 (or other object) and rotating the head 114 around or about the center axis 101.

FIG. 6 illustrates an exploded view of the fastener assembly 100 and the components 300, 400 according to one embodiment. In operation, the fastener assembly 100 is inserted into a hole or opening 700 in the component 300 (e.g., the underbody trim) and the hole or opening 302 in the component 400 (e.g., the body frame of the vehicle) while the holes or openings 700, 302 are axially aligned with each other.

The fastener assembly 100 is inserted into the holes or openings 302, 700 until the fixation member 104 is past or beyond both components 300, 400. Moving the fixation member 104 through both openings 302, 700 causes the fixation member 104 to engage the components 300, 400 as shown above in connection with FIG. 4.

Figure 7:
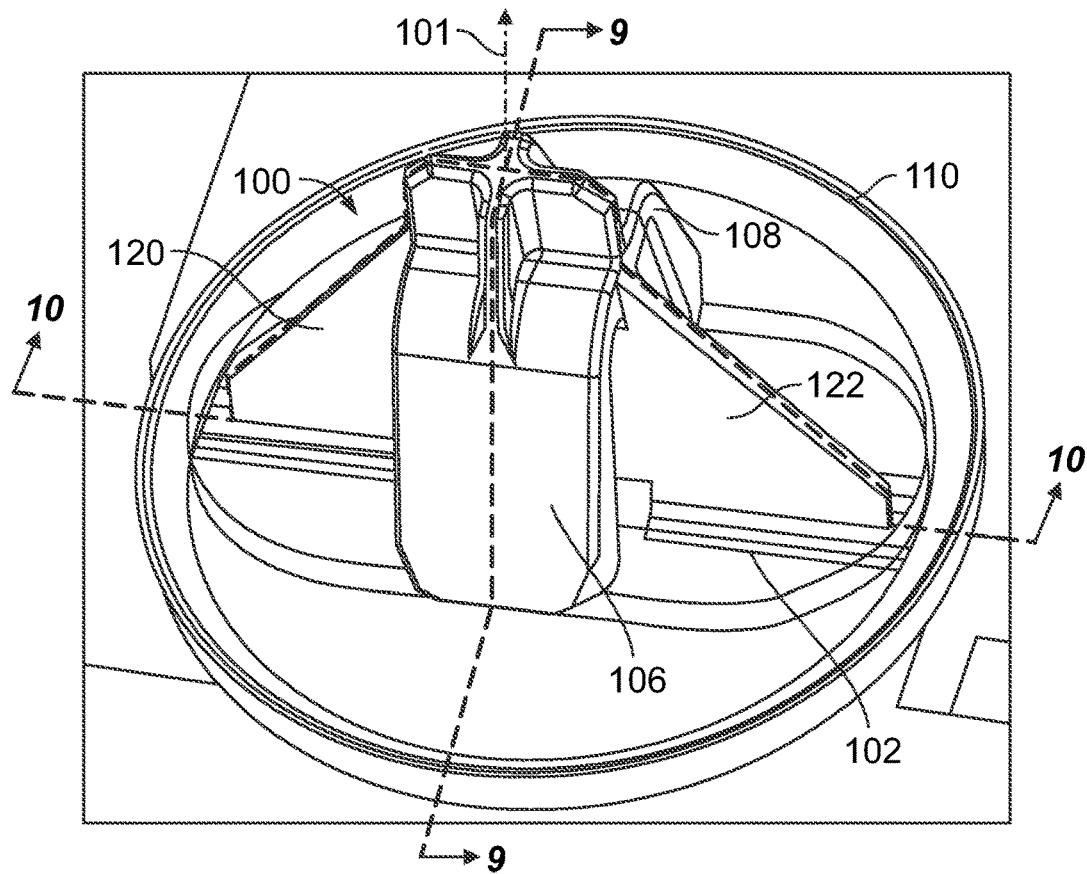
FIG. 7 illustrates a perspective view of the fastener assembly shown in FIGS. 1 and 2 engaged with the components in the locked state according to one embodiment of the subject matter described herein.
Figure 8:
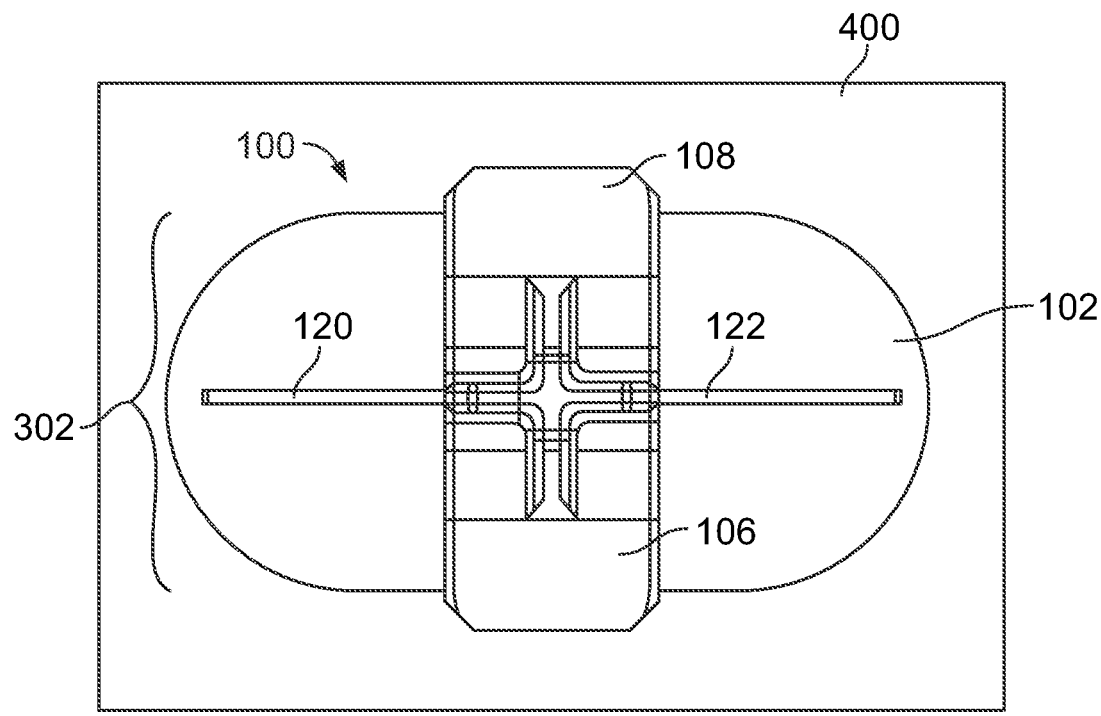
FIG. 8 illustrates a top view of the fastener assembly shown in FIGS. 1 and 2 engaged with the components in the locked state according to one embodiment of the subject matter described herein.
Figure 9:
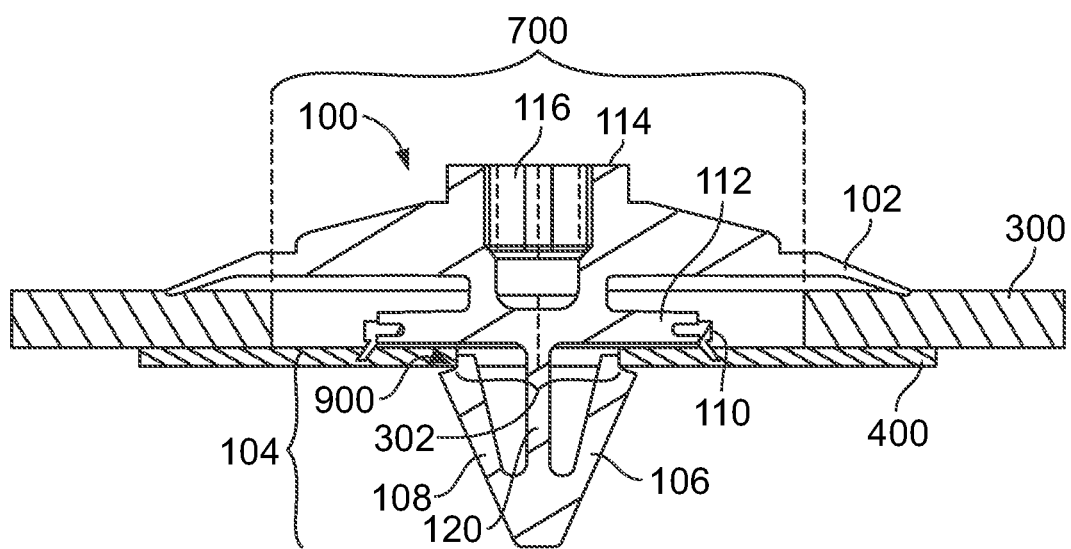
FIG. 9 illustrates a cross-sectional view of the fastener assembly shown in FIGS. 1 and 2 engaged with the components in the locked state along line 9-9 shown in FIG. 7.
Figure 10:
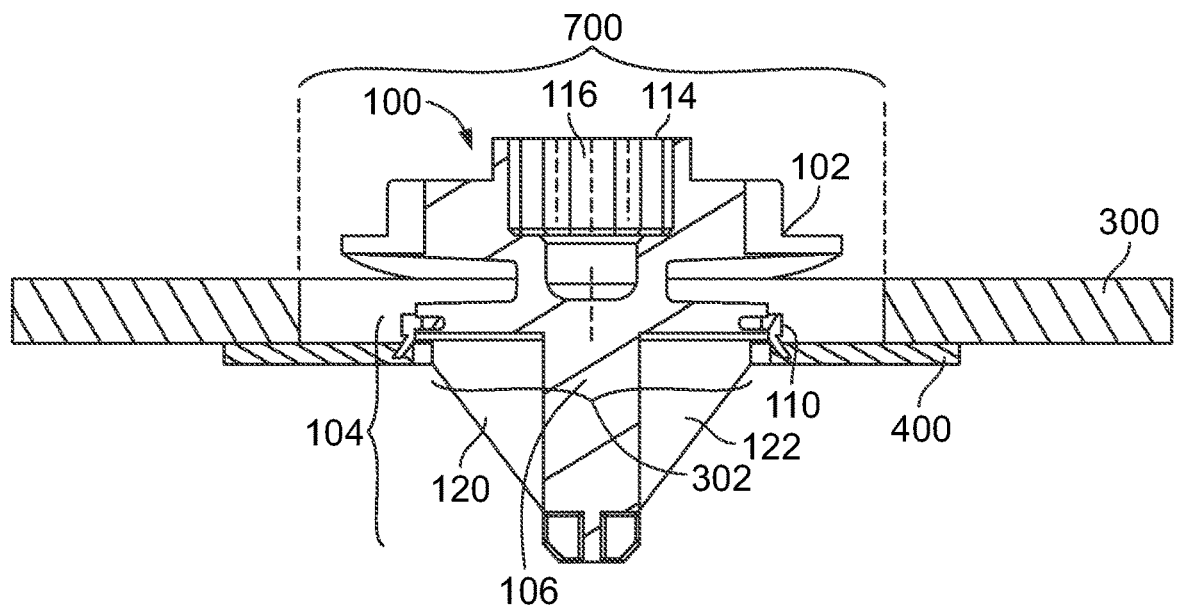
FIG. 10 illustrates a cross-sectional view of the fastener assembly shown in FIGS. 1 and 2 engaged with the components 300, 400 in the locked state along line 10-10 shown in FIG. 7.

Several Figures show the fastener assembly 100 engaged with the components 300, 400 to couple the components 300, 400 with each other. FIG. 7 illustrates a perspective view of the fastener assembly 100 engaged with the components 300, 400 in the locked state according to one embodiment of the subject matter described herein. FIG. 8 illustrates a top view of the fastener assembly 100 engaged with the components 300, 400 in the locked state according to one embodiment of the subject matter described herein. FIG. 9 illustrates a cross-sectional view of the fastener assembly 100 engaged with the components 300, 400 in the locked state along line 9-9 shown in FIG. 7 according to one embodiment of the subject matter described herein. FIG. 10 illustrates a cross-sectional view of the fastener assembly 100 engaged with the components 300, 400 in the locked state along line 10-10 shown in FIG. 7 according to one embodiment of the subject matter described herein. With respect to the cross-sectional views shown in FIGS. 9 and 10, the cross-sectional views illustrate two-dimensional planes that both extend through and intersect at and along the center axis 101. The cross-sectional view shown in FIG. 9 illustrates the position of the angled arms 106, 108 of the fixation member 104 of the fastener assembly 100 in a first plane, while the cross-sectional view shown in FIG. 10 illustrate the position of the ribs 120, 122 of the fixation member 104 of the fastener assembly 100 in a second plane that is orthogonal (e.g., angled at ninety degrees) to the first plane.

As shown in FIGS. 6 and 8, the hole or opening 302 in the component 400 through which the fixation member 104 is inserted can be elongated along one direction. In the illustrated embodiment, the hole or opening 302 is elongated along the same direction or in a direction that is parallel to the direction in which the ribs 120, 122 extend and are aligned with each other. For example, the hole or opening 302 can be elongated in a direction or directions that are parallel to the line 10-10 shown in FIG. 7.

The fastener assembly 100 is inserted into the hole 302 in the component 400 and the hole 700 in the component 400 (not visible in FIGS. 7 and 8) such that bottom edges 900 of the angled arms 106, 108 in the fixation member 104 engage or directly abut the component 400, as shown in FIG. 9. The edges 900 are the free ends of the cantilevered arms 106, 108. Opposite ends of the arms 106, 108 are coupled with each other and/or the ribs 120, 122 at or on the center axis 101.

The fastener assembly 100 can be inserted into the holes 302, 700 along a linear path that is coincident with the center axis 101. The arms 106, 108 of the fixation member 104 are cantilevered beams in the illustrated embodiment (as shown in FIG. 9). This allows for the arms 106, 108 to flex inward toward each other and toward the center axis 101 during insertion of the fastener assembly 100 into the hole 302. Once the bottom edges 900 of the arms 106, 108 are past the edge of the component 400 around the hole 302, the arms 106, 108 can snap back into the position shown in FIG. 9 (e.g., away from each other and away from the center axis 101).

The securing panel 102 engages an opposite surface of the component 300 such that the components 300, 400 are sandwiched between the securing panel 102 and the edges 900 of the angled arms 106, 108. The sealing member 110 engages or directly abuts the component 400 inside the hole or opening 700 in the component 300, as shown in FIGS. 9 and 10. This engagement between the sealing member 110 and the component 400 creates a seal around the hole or opening 302 to prevent moisture, dirt, or the like, from passing through the opening 302 in the component 400.

Figure 11:
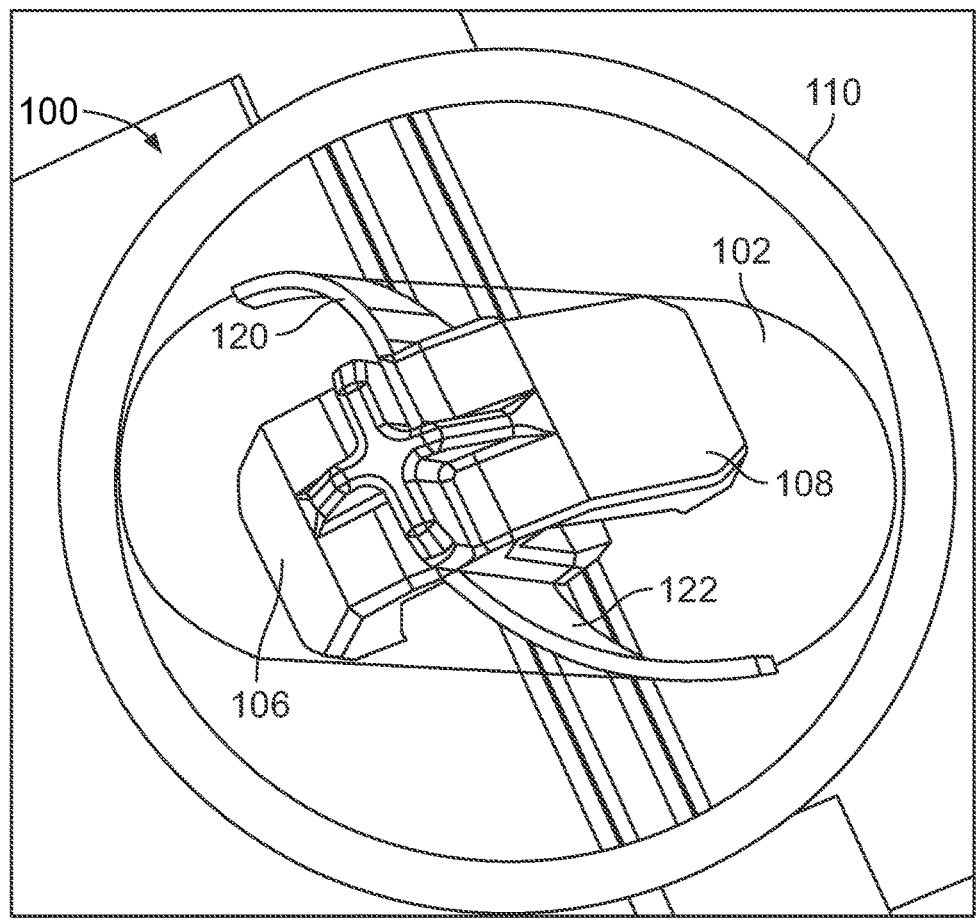
FIG. 11 illustrates a perspective view of the fastener assembly shown in FIGS. 1 and 2 in an unlocked state according to one embodiment of the subject matter described herein.
Figure 12:
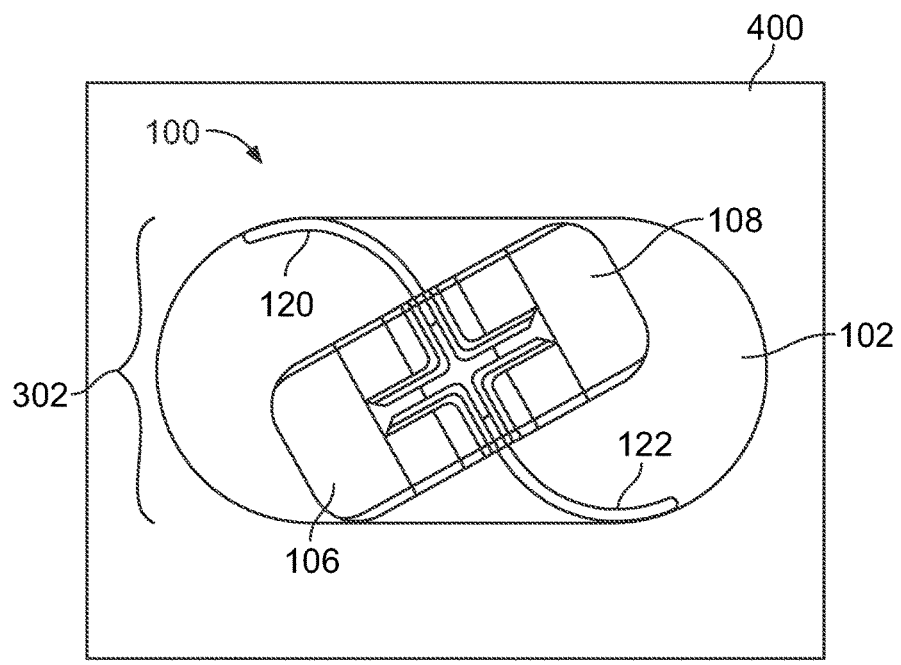
FIG. 12 illustrates a top view of the fastener assembly shown in FIGS. 1 and 2 in an unlocked state according to one embodiment of the subject matter described herein.

FIG. 11 illustrates a perspective view of the fastener assembly 100 in an unlocked state according to one embodiment of the subject matter described herein. FIG. 12 illustrates a top view of the fastener assembly 100 in an unlocked state according to one embodiment of the subject matter described herein. The fastener assembly 100 can transition from the locked state to the unlocked state by twisting the head 114 slighting clockwise or counter-clockwise around the center axis 101. This twisting causes the arms 106, 108 to no longer engage the edges of the component 300 around the hole or opening 302. For example, a person or machine can grasp or use the tool 500 to grasp the head 114 of the fastener assembly 100. The person or machine can then rotate the head 114 to cause the ribs 120, 122 to flex and press against the edges of the component 400 around the opening 302.

The head 114 can be rotated sufficiently far to cause the arms 106, 108 to no longer engage the component 400 around the opening 302, as shown in FIGS. 11 and 12. The fastener assembly 100 can then be removed from the openings 302, 700 in a direction along the center axis 101 to decouple the fastener assembly 100 from the components 300, 400 and to decouple the components 300, 400 from each other. The head 114 may not require being rotated by a large distance to unlock the fastener assembly 100. For example, due to the arrangement of the arms 106, 108 and the ribs 120, 122, the head 114 and fixation member 104 can be rotated by sixty degrees or less to unlock the fastener assembly 100.

In the illustrated embodiment, the securing panel 102 includes compensation wings 902 (shown in FIG. 9) that are compressed against the component 300 while the fastener assembly 100 is in the locked state against the component 300. The wings 902 are extensions of the opposite ends of the securing panel 102 that are angled downward toward the component 300. The remainder of the securing panel 102 may be oriented parallel to (and not angled toward) the component 300). The orientation of the wings 902 toward the component 300 causes the wings 902 to be partially compressed against the component 300, which causes the wings 902 to exert a force on the component 300 in a direction away from the component 300. This force assists in removing the fastener assembly 100 from the holes 302, 700 in the components 300, 400.

The fastener assembly 100 can return to a locked state if not removed from the holes 302, 700. For example, twisting of the head 114 causes the ribs 120, 122 to engage and bend against the edges of the component 400 around the opening 302. This bending causes the ribs 120, 122 to operate as springs that apply a force against the edges of the component 400 that are around the opening. This force causes the arms 106, 108 to rotate over and engage the component 400 (and thereby move the fastener assembly 100 to the locked state described above) when the head 114 is released by the tool 500 or person.

Figure 13:
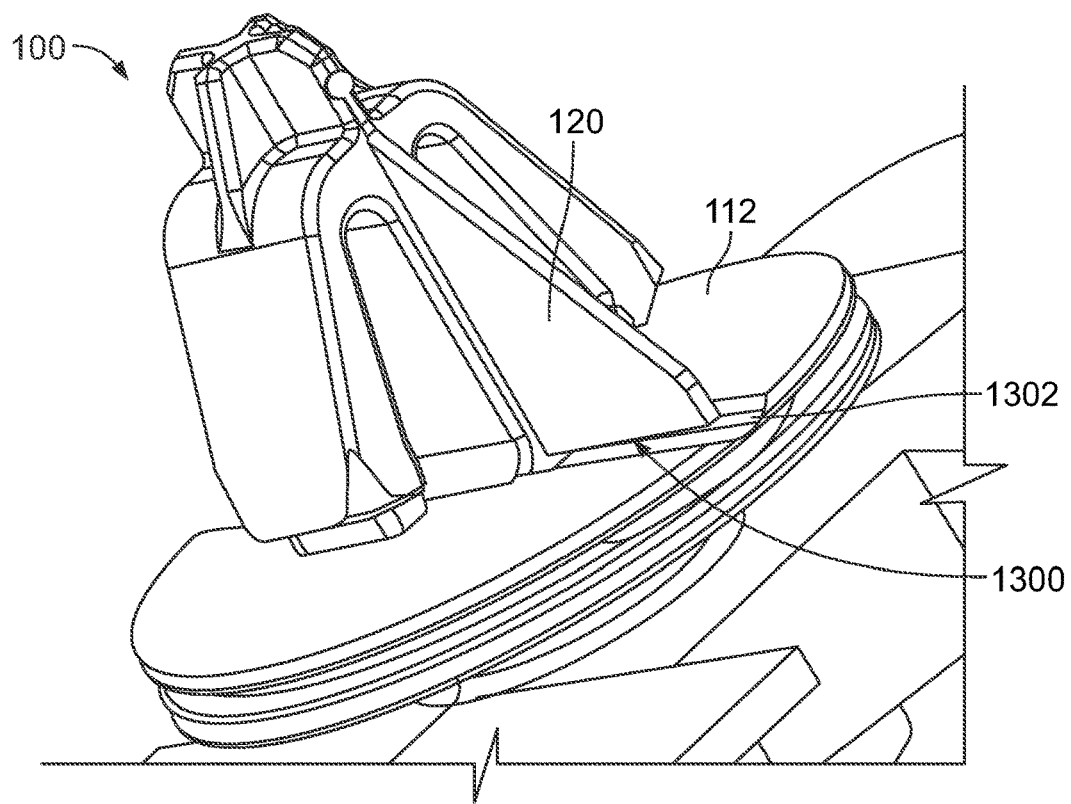
FIG. 13 illustrates one embodiment of an interface between bottom edges of ribs and a collar in the fastener assembly.

FIG. 13 illustrates one embodiment of an interface between bottom edges 1300 of the ribs 120, 122 and the collar 112 in the fastener assembly 100. The ribs 120, 122 can have smooth, linear surfaces along the bottom surfaces of the ribs 120, 122 that face or oppose the collar 112. The collar 112 can have a smooth, planar surface (as shown in FIGS. 5, 9, and 10), or can have a groove indentation 1302, as shown in FIG. 13. This groove indentation 1302 can be elongated along a common direction as the bottom edge 1300 of the rib 120 when the fastener assembly 100 is in the locked state. The groove indentation 1302 can receive the bottom edge 1300 of the rib 120 when the fixation member 104 is twisted. The groove indentation 1302 receives the rib 120 and can secure the rib 120 in place in the locked state.

Figure 14:
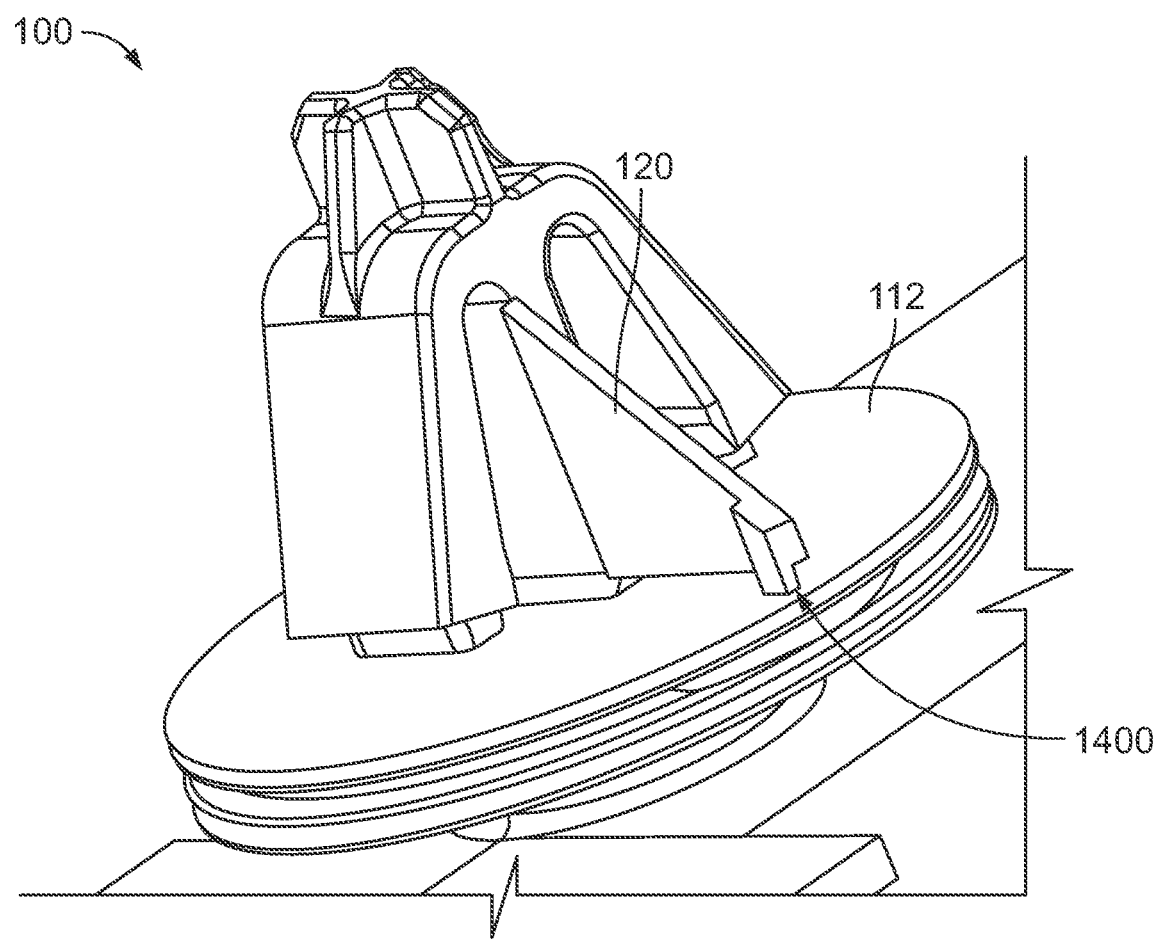
FIG. 14 illustrates another embodiment of an interface between bottom edges of the ribs and the collar in the fastener assembly.

FIG. 14 illustrates another embodiment of an interface between bottom edges of the ribs 120, 122 and the collar 112 in the fastener assembly 100. In contrast to the smooth, linear surfaces along the bottom surfaces of the ribs 120, 122 that face or oppose the collar 112 in one or more other embodiments, the ribs 120, 122 in the illustrated embodiment have protrusions 1400. These protrusions 1400 can grasp the component 400 when the fastener assembly 100 is twisted to the unlocked state. The protrusions 1400 can dig into the component 400 and keep the fastener assembly 100 in the unlocked state until the fastener assembly 100 is twisted in an opposite direction to lock the fastener assembly 100.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the disclosure and defined herein extends to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

Various features of the disclosure are set forth in the following claims.

What is claimed is:
1. A fastener assembly comprising:
a securing panel that is elongated along two or more directions; and
a fixation member coupled with the securing panel and projecting away from the securing panel along a center axis, the fixation member including opposing arms that are angled toward the center axis, the fixation member also including opposite ribs disposed between the arms and angled toward the center axis, the fixation member configured to be inserted through openings in first and second components, wherein the arms of the fixation member engage the first component and the securing panel engages the second component while the fastener assembly is in a locked state to secure the first and second components together, wherein the fixation member is configured to be partially rotated around the center axis to transition the fixation member to an unlocked state, wherein the ribs are brought into contact with an edge of the first component and the arms are moved out of contact with the first component while the fastener assembly is in the unlocked state to decouple the first and second components from each other.

2. The fastener assembly of claim 1, wherein the arms and the ribs of the fixation member are angled toward a common point on the center axis.

3. The fastener assembly of claim 1, further comprising a collar disposed between the securing panel and the fixation member, wherein the collar and the arms of the fixation member secure the first component between the collar and the arms while the fastener assembly is in the locked state.

4. The fastener assembly of claim 1, further comprising a collar disposed between the securing panel and the fixation member, wherein the collar includes a flexible sealing member around the collar, the flexible sealing member configured to engage the first component around the opening in the first component while the fastener assembly is in the locked state.

5. The fastener assembly of claim 1, further comprising a collar disposed between the securing panel and the fixation member, wherein the collar includes a groove indentation that is aligned with and that receives at least one of the ribs while the fastener assembly is in the locked state.

6. The fastener assembly of claim 1, wherein the arms of the fixation member are cantilevered beams having free ends that are positioned to engage the first component.

7. The fastener assembly of claim 1, wherein the ribs are positioned to be bent against the first component while the fastener assembly is twisted to the unlocked state, the ribs shaped to impart a force on the edge of the first component that pushes the fastener assembly back toward the unlocked state.

8. The fastener assembly of claim 1, wherein the securing panel includes compensation wings that are shaped to be angled toward the second component, the compensation wings positioned to impart a force on the second component while the fastener assembly is in the locked state that pushes the fastener assembly out of the openings in the first and second components.

9. The fastener assembly of claim 1, further comprising a receiving head coupled with the securing panel on a side of the securing panel that is opposite of the fixation member, the receiving head shaped to receive a tool that twists the fixation member around the center axis.

10. A fastener assembly comprising:
an elongated securing panel; and
a fixation member that is coupled with the securing panel and that is elongated along a center axis that is orthogonal to directions in which the securing panel is elongated, the fixation member including cantilevered arms that are angled toward the center axis, wherein the fixation member also includes ribs that are disposed between the arms and angled toward the center axis, the fixation member configured to be inserted through openings in first and second components,
wherein the arms of the fixation member engage the first component and the securing panel engages the second component while the fastener assembly is in a locked state to secure the first and second components together, wherein the fixation member is configured to be partially rotated around the center axis to transition the fixation member to an unlocked state to release the first component from the second component, and wherein the ribs are positioned to be bent against the first component while the fastener assembly is twisted to the unlocked state, the ribs shaped to impart a force on the edge of the first component that pushes the fastener assembly back toward the unlocked state.

11. The fastener assembly of claim 10, wherein the ribs are brought into contact with an edge of the first component and the arms are moved out of contact with the first component while the fastener assembly is in the unlocked state to decouple the first and second components from each other.

12. The fastener assembly of claim 11, wherein the arms and the ribs of the fixation member are angled toward a common point on the center axis.

13. The fastener assembly of claim 10, further comprising a collar disposed between the securing panel and the fixation member, wherein the collar and the arms of the fixation member secure the first component between the collar and the arms while the fastener assembly is in the locked state.

14. The fastener assembly of claim 10, further comprising a collar disposed between the securing panel and the fixation member, wherein the collar includes a flexible sealing member around the collar, the flexible sealing member configured to engage the first component around the opening in the first component while the fastener assembly is in the locked state.

15. The fastener assembly of claim 10, further comprising a collar disposed between the securing panel and the fixation member, wherein the collar includes a groove indentation that is aligned with and that receives at least one of the ribs while the fastener assembly is in the locked state.

16. The fastener assembly of claim 10, wherein the arms of the fixation member are cantilevered beams having free ends that are positioned to engage the first component.

17. The fastener assembly of claim 10, wherein the securing panel includes compensation wings that are shaped to be angled toward the second component, the compensation wings positioned to impart a force on the second component while the fastener assembly is in the locked state that pushes the fastener assembly out of the openings in the first and second components.

18. The fastener assembly of claim 10, further comprising a receiving head coupled with the securing panel on a side of the securing panel that is opposite of the fixation member, the receiving head shaped to receive a tool that twists the fixation member around the center axis.

19. A fastener assembly comprising:
a securing panel that is elongated along two or more directions; and
a fixation member coupled with the securing panel and projecting away from the securing panel along a center axis, the fixation member including cantilevered arms having free ends that are angled away from the center axis, the fixation member also including opposite ribs disposed between the arms and angled toward the center axis, the fixation member configured to be inserted through openings in first and second components,
wherein the free ends of the arms of the fixation member engage the first component and the securing panel engages the second component while the fastener assembly is in a locked state to secure the first and second components together, wherein the fixation member is configured to be partially rotated around the center axis to transition the fixation member to an unlocked state, wherein the ribs are brought into contact with an edge of the first component and the arms are moved out of contact with the first component while the fastener assembly is in the unlocked state to decouple the first and second components from each other.

20. The fastener assembly of claim 19, wherein the ribs are positioned to be bent against the first component while the fastener assembly is twisted to the unlocked state, the ribs shaped to impart a force on the edge of the first component that pushes the fastener assembly back toward the unlocked state.

\* \* \* \* \*